United States Patent [19]

Kehl et al.

[11] Patent Number: 5,305,886
[45] Date of Patent: Apr. 26, 1994

[54] DECONTAMINATION PROCESS

[75] Inventors: Randall J. Kehl; John W. Verbicky, Jr., both of Scotia, N.Y.

[73] Assignee: General Electric Company, Schenectady, N.Y.

[21] Appl. No.: 96,109

[22] Filed: Jul. 22, 1993

Related U.S. Application Data

[63] Continuation of Ser. No. 826,692, Jan. 28, 1992, abandoned.

[51] Int. Cl.$^5$ .............................................. B03B 9/00
[52] U.S. Cl. ........................................ 209/2; 209/3; 209/10; 209/235; 209/268; 134/30; 422/26; 422/32
[58] Field of Search ...................... 209/2, 3, 5, 10, 11, 209/235, 238, 268; 422/26, 32; 134/30, 31, 37

[56] References Cited

U.S. PATENT DOCUMENTS

| | | | |
|---|---|---|---|
| 4,097,306 | 6/1978 | Carman | 134/30 X |
| 4,236,995 | 12/1980 | Kruyer | 209/5 X |
| 4,359,381 | 11/1982 | Jinno | 209/238 X |
| 4,392,949 | 7/1983 | Kruyer | 209/5 |
| 4,415,335 | 11/1983 | Mainwaring et al. | 209/5 X |
| 4,859,323 | 8/1989 | Rolfvondenbaumen | 209/3 X |

*Primary Examiner*—David H. Bollinger
*Attorney, Agent, or Firm*—James Magee, Jr.

[57] ABSTRACT

Contaminated particulate materials of varying particle sizes are washed and separated by size by a steam washing process which concentrates the contaminant in the small size fraction.

1 Claim, No Drawings

DECONTAMINATION PROCESS

This application is a continuation of application Ser. No. 07/826,692 filed Jan. 28, 1992, now abandoned.

This invention is directed to a method for removing oil-based contaminants from particulate substrates and more particularly to decontamination of sand and soil mixtures by removal of oil or oil like material from the surfaces of the constituent particles. In another embodiment, the invention is directed to a process for reducing the volume of contaminated particles which must be subjected to further processing in order to remove or destroy the contaminant.

BACKGROUND OF THE INVENTION

Water washing of contaminated soil using solutions of surfactants and chelating agents is known. Such systems use substantial volumes of liquid water to dissolve or wash away contaminants from the surface of the bulk soil particles.

In other decontamination systems, volatile contaminants are removed by vaporization with steam under conditions which maintain the steam and the entrained contaminant in the vapor phase for removal by vacuum or vapor flow means.

Separation of particulate materials and segregation by size is well known. A variety of devices and systems are known. For example, spiral separators, vibrating screens and sieves and the like.

Soil washing is a volume reduction technique for treating soil or other particulate materials contaminated by a variety of chemical and physical agents such as oils, chemical waste etc. The particulate material is slurried with water and subjected to one or more stages of scrubbing with classification according to particle size between successive stages. Separation of the washed coarser particles from the more highly contaminated fine particles achieves a substantial reduction in the volume of material requiring further treatment or disposal.

Soil washing techniques are based on the theory that the contaminants are concentrated in fine size portion of the material and that the contaminants associated with the coarser or larger size particles tend to be associated with the surface of the particle.

OBJECT OF THE INVENTION

One of the principal objects of this invention is to provide a relatively simple method for reducing the cost of conventional decontamination techniques by reducing the volume of contaminated material to which the conventional procedures must be applied.

Another object of the invention is to provide a technique for segregation of large less contaminated particulate materials from smaller sized more highly contaminated materials. Another object is to facilitate concentration of oil-based contaminants in or with a particular size mass of particulate materials.

These and other objects are achieved by a process in which remediation is accomplished by steam washing the contaminated material while separating the size fractions thereof. In this process, steam is directed onto the particles thereby washing the contaminant from the larger particles and concentrating it with the smaller particles which are subsequently recovered for further treatment by conventional methods. By the practice of this process, the volume of contaminated material is reduced by separation of the highly contaminated fraction, i.e., the small particle portion, while simultaneously cleaning the less contaminated portion which consists of the larger particles.

The practice of this invention is illustrated by the following examples.

EXAMPLE 1

About 10 pounds of sand having particles ranging from about 100 to about 300 microns was contaminated with transformer grade oil. A vibratory separator was assembled with a 100 micron screen. The sand was placed in the separator and a sample taken. The system was sealed and steam was introduced into the chamber through 3 nozzles from a steam line at a pressure ranging from about 28 to 50 psig with the vibrator in operation. Periodically, during a twenty minute test time the steam was stopped and sample of the sand was taken for analysis. The concentration of contaminant was found to decrease with time from an initial concentration of about 7263 ppm. About 86% of the transformer oil was removed during the first 10 minutes of the experiment. The analytical results are set forth in Table 1, below.

TABLE 1

| Time (minutes) | Concentration (ppm) |
| --- | --- |
| 0 | 7263 |
| 1 | 5760 |
| 2 | 5268 |
| 3 | 4343 |
| 4 | 3539 |
| 5 | 2408 |
| 6 | 1699 |
| 7 | 1963 |
| 8 | 1689 |
| 9 | 1223 |
| 10 | 1003 |
| 11 | 768 |
| 13 | 692 |
| 16 | 436 |
| 20 | 198 |

The concentration of oil was determined by extracting the sand sample with carbon tetrachloride and measuring the amount of oil in the extractant by infrared spectroscopy.

Steam cleaning and size separation of oil contaminated sand is illustrated by Example 2, below.

EXAMPLE 2

A vibratory screen separator was assembled with 35 mesh (less than 2 mm), 50 mesh (0.5–2 mm), and 150 mesh (100 micron–0.5 mm) screens. A synthetic sand mixture was prepared and admixed with about 10,000 ppm of transformer oil. About 11 pounds of the admixture was placed on the top (coarse) screen and shaken for about 5 minutes after which samples were taken to determine the initial contamination level for each fraction. Steam was then introduced and shaking continued for a period of about 20 minutes. Samples for analysis were taken at 5 minute intervals. The results are set forth in Table 2, below.

TABLE 2

| Steam Time | Oil by Size Fraction (ppm) | | |
| --- | --- | --- | --- |
| | 35 mesh | 50 mesh | 150 mesh |
| 0 (5 minute shake) | 5211 | 9078 | 9179 |
| 5 | 2591 | 8950 | ? |
| 10 | 1978 | 6850 | 7151 |
| 15 | 1908 | 5525 | 6719 |

TABLE 2-continued

| Steam Time | Oil by Size Fraction (ppm) | | |
|---|---|---|---|
| | 35 mesh | 50 mesh | 150 mesh |
| 20 | 1955 | 4760 | 4968 |

The data show that the 35 mesh material was substantially cleaned in the first 5 minute period of steam application. The two smaller size fractions were seen to experience continued clean up during periods of steam application.

EXAMPLE 3

Subsurface soil from the vicinity of a fuel oil storage tank area in which Number 2, 4, and 6 fuel oils were stored was used in this experiment. The raw contamination level for the unsegregated soil was about 4300 ppm. The contaminant is believed to be composed of the heavier fractions of oil which have not evaporated or washed away since being released onto the ground.

The vibratory screening apparatus was assembled as in Example 2. An initial sample was taken after about 5 minutes of operation, without steam, to determine the base line level of contaminant concentration for each size fraction. Analysis was by a gravimetric method, hereafter described. The apparatus was then operated while steam was introduced into the apparatus so as to contact the soil being classified. At intervals, the operation was interrupted to remove a sample of each fraction for analysis, after which steam washing was continued.

The concentration of hexane extractable contaminant was determined gravimetrically by the following procedure. A sample of soil was weighed out in a Soxhlet thimble. The actual soil weight was determined by subtracting the thimble weight. Approximately 160 ml of hexane was used to perform the extraction. In all experiments the extraction was done overnight (minimum of 16 hours). The collection flask was also weighed before beginning.

After extracting, the collection flask was lowered from the Soxhlet and hexane was allowed to evaporate. A slight nitrogen purge was used to accelerate the evaporation of the hexane. The soil was also allowed to dry. The weights of each were recorded and a mass balance was done. A small loss was noted overall and was attributed to moisture in the soil and on the glassware that was removed during the drying process. After purging with nitrogen the weight was at its lowest point and then continued to increase slightly with time as a result of moisture re-absorbing on to the glassware. A slight increase in weight with time was also observed with the soil.

The concentration was calculated based on weight loss from the soil and by weight gain in the collection flask. An average was taken to give an approximate concentration. The reasoning behind this was based on the fact that as the soil and flask gained weight the calculated concentrations converged on each other indicating the actual concentration was between these two values.

TABLE 3

| Steam Time (minutes) | Contaminant Concentration (ppm) by Fraction | | |
|---|---|---|---|
| | 35 mesh | 50 mesh | 150 mesh |
| 0 (5 min. shake) | 2768.5 | 2856 | 2752 |
| 8 | 639.5 | 1154.5 | 1361 |
| 13 | 922.5 | 1034.5 | 993 |
| 20 | 815 | 980 | 704 |
| 30 | 878.5 | 856 | 593 |

The data show that the concentration of contaminant decreased with washing time for all fractions.

What is claimed is:

1. A method for reducing the volume of oil-contaminated particulate material of varying size which comprises contacting an oil-contaminated volume of particulate material comprising particles of varying size with a washing means consisting of steam, transferring oil contaminants from surfaces of large particles to surfaces of small particles, while screen separating the material into fractions by size whereby the oil contaminant becomes concentrated in the small particle size fraction.

* * * * *